(No Model.) 3 Sheets—Sheet 1.

A. BICHET & H. O'NEILL.
HOSE COUPLING.

No. 527,764. Patented Oct. 23, 1894.

Witnesses.
L. G. Scheetz
C. W. Terry

Inventors
Alphonse Bichet & Henry O'Neill
By N. B. Hagin.
atty (No Model.) 3 Sheets—Sheet 2.

A. BICHET & H. O'NEILL.
HOSE COUPLING.

No. 527,764. Patented Oct. 23, 1894.

Witnesses
Geo. E. Spalton.
L. G. Scheetz

Inventors.
Alphonse Bichet
and
Henry O'neill
By N. B. Hagin. Atty.

(No Model.) 3 Sheets—Sheet 3.
A. BICHET & H. O'NEILL.
HOSE COUPLING.
No. 527,764. Patented Oct. 23, 1894.
Fig. 9.
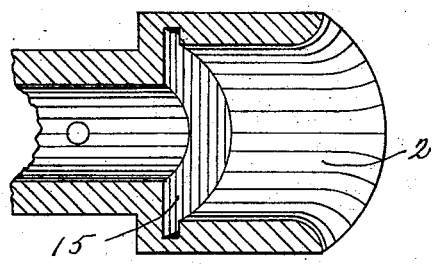
Fig. 10. Fig. 11.
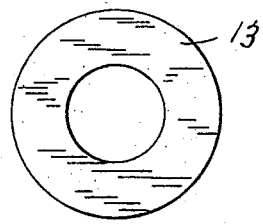 
Witnesses
W. D. Hatton.
H. W. Schroeder.
Inventors
Alphonse Bichet & Henry O'Neill
By N. B. Hagin
Atty

UNITED STATES PATENT OFFICE.

ALPHONSE BICHET AND HENRY O'NEILL, OF FLORENCE, KANSAS.

HOSE-COUPLING.

SPECIFICATION forming part of Letters Patent No. 527,764, dated October 23, 1894.

Application filed March 1, 1894. Serial No. 501,961. (No model.)

*To all whom it may concern:*

Be it known that we, ALPHONSE BICHET and HENRY O'NEILL, citizens of the United States of America, residing at Florence, in the county of Marion and State of Kansas, have invented certain new and useful Improvements in Hose-Couplings, of which the following is a specification, reference being had therein to the accompanying drawings and the figures of reference thereon, forming a part of this specification, in which—

Figure 1:
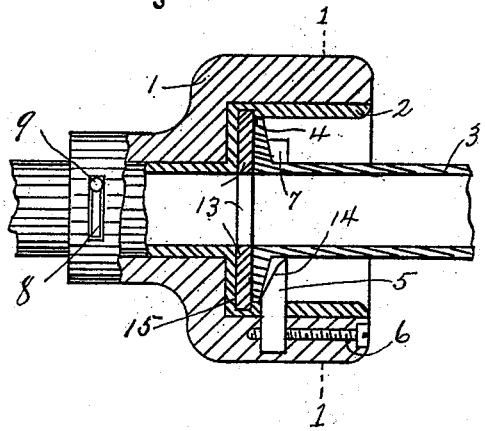
Figure 3:
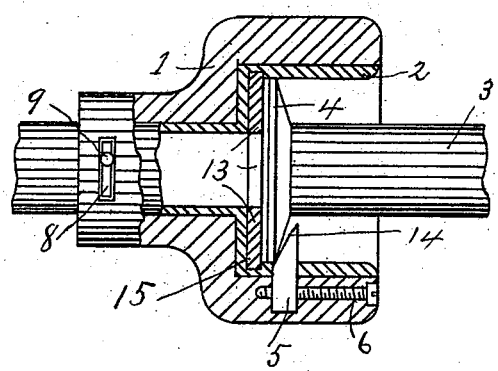
Figure 2:
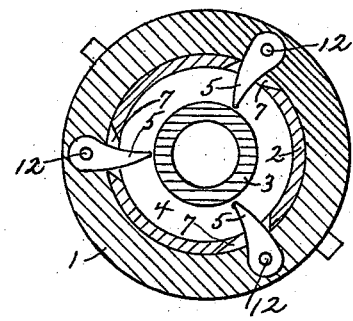
Figure 4:
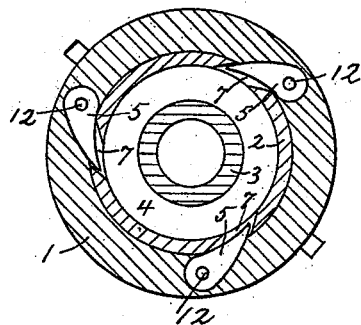
Figures 5, 6:
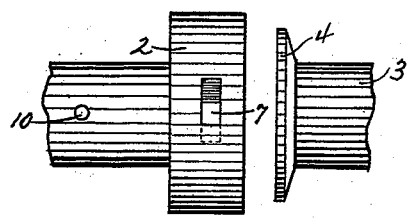
Figure 7:
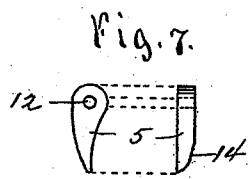
Figure 8:
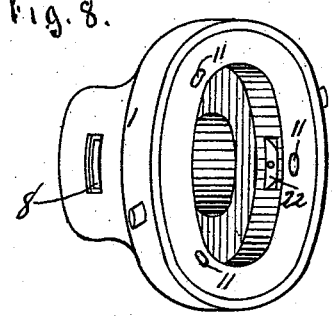

Figure 1 is a cross sectional view of the hose-coupling, with a portion of the collar in elevation. Fig. 2 is a sectional view of the same, on a line with 1, 1, (see Fig. 1) to show the dogs holding the coupling together. Fig. 3 is a cross sectional view of the coupling, with the male coupling not quite up to the packing. Fig. 4 is a sectional view of the same on a line with 1, 1, (see Fig. 1) to show the dogs entering the slots in the female coupling, and in shape to receive the male coupling. Fig. 5 is a side view of the male coupling. Fig. 6 is a side view of the female coupling with the collar removed. Fig. 7 is a side and edge view of one of the dogs, and Fig. 8 is a perspective view of the collar. Fig. 9 is a sectional detail perspective of the female coupling, showing the groove to receive the packing. Fig. 10 is a side view of the packing. Fig. 11 is an edge view of the same.

This invention relates to certain improvements in hose-couplings, and consists in male and female coupling parts with a collar provided with dogs for holding the coupling together.

Referring to the drawings 1, represents a collar which is provided with the dogs 5, which are pivotally held in the recesses 22, (see Fig. 8) by means of the screw 6, which passes through the hole 11, in the collar and the hole 12 of the dogs. It is also provided with the slot 8, through which passes the screw 9, and into the hole 10 in the female coupling 2.

4 is a flange on one end of the male coupling 3. On one end of the female coupling 2 is formed a chamber in which is provided the packing 13, against which the flange 4 butts, and is held in place by the dogs 5. Said dogs are tapered as shown at 14, which acts as a wedge against the tapered rear side of the flange 4.

The collar 1, is sleeved on the female coupling 2, and is adapted to rotate on said coupling the length of the slot 8, or enough to permit the dogs 5, to pass from the position shown in Fig. 4, to that shown in Fig. 2, and vice versa. The female coupling 2 is provided with the recesses 7, to permit the dogs 5, to pass through to come in contact with the male coupling.

The collar 1 is sleeved over the female coupling and so adjusted that the free end of the dogs will be in the slots in the coupling 2 as shown in Fig. 4, the slot 8 being made in the position that, when the dogs are in said position the set screw 9 being put in, will not allow the collar to turn back any farther, thus preventing the free end of the dogs to slip out of the slots 7.

In the act of coupling the male coupling is entered into the coupling 2 when the collar is turned the length of the slot 8, which will force the dogs 5 through the slots 7 and back of the collar 4. Should the male coupling 3 not be snug against the packing 13, as shown in Fig. 3, it would be indicated by the screw 9, not being to the extreme end of the slot 8, as shown in Fig. 3. By turning the collar still farther around the beveled edge of the dog will by pressing against the beveled side of the flange, force the male coupling 3 snug against the packing 13, as shown in Fig. 1. For uncoupling the collar is turned in the opposite direction until the screw 9, is in the opposite end of the slot 8 which will draw the dogs 5 back to the position shown in Fig. 4, when the male coupling 3 will be free to be released.

Having thus described our invention, what we claim as new and useful, and desire to secure by Letters Patent, is as follows:

1. In the herein described hose-coupling, the combination of the female coupling having the slot 7 and an annular recess 15, the packing 13 to fit in said recess 15, the male coupling provided with an annular flange, the face or end having a flat surface and adapted to enter the enlarged end of the said female coupling, the flat surface of said flange to butt up against said packing 13, the rear side of said flange being beveled, the movable collar having the recesses 22, the wedge shaped dogs 5 pivoted in the said recesses 22 in the collar 1 with their free end passing through the slot 7 in the female coupling, and engaging the beveled side of the flange of the male coupling, substantially as shown and for the purpose specified.

2. In a hose coupling the combination with the male coupling having the flange 4 with its rear side beveled, the female coupling having the recesses 7, the collar 1 having the recesses 22, said collar adapted to turn on the female coupling, and provided with the slot 8, the screw 9 adapted to hold the said collar on the female coupling by passing through the slot 8, the dogs 5 having the beveled sides 14, pivoted in the recesses 22 of the collar 1 with their free ends passing through the recesses 7 and the said beveled sides 14 adapted to engage the beveled side of the flange 4, substantially as shown and described.

ALPHONSE BICHET.
HENRY O'NEILL.

Witnesses:
O. H. DRINKWATER,
H. L. DWELLE.